(12) United States Patent
Lupu et al.

(10) Patent No.: US 8,461,806 B2
(45) Date of Patent: Jun. 11, 2013

(54) SYSTEMS AND METHODS FOR CELL BALANCING

(75) Inventors: Flavius Lupu, San Jose, CA (US); Constantin Bucur, Sunnyvale, CA (US); Xiaojun Zeng, Shanghai (CN); Kalyi Sheng, Shanghai (CN); Anquan Xiao, Shanghai (CN)

(73) Assignee: O2Micro Inc, Santa Clara, CA (US)

( * ) Notice: Subject to any disclaimer, the term of this patent is extended or adjusted under 35 U.S.C. 154(b) by 1197 days.

(21) Appl. No.: 11/974,530

(22) Filed: Oct. 15, 2007

(65) Prior Publication Data
US 2009/0096420 A1    Apr. 16, 2009

(51) Int. Cl.
*H02J 7/00*    (2006.01)
(52) U.S. Cl.
USPC .......................................... 320/122; 320/132
(58) Field of Classification Search
USPC .......................................... 320/116–123, 132
See application file for complete search history.

(56) References Cited

U.S. PATENT DOCUMENTS

| | | | |
|---|---|---|---|
| 5,153,496 A | 10/1992 | LaForge | |
| 5,578,914 A * | 11/1996 | Morita | 320/122 |
| 5,659,237 A * | 8/1997 | Divan et al. | 320/119 |
| 6,873,134 B2 * | 3/2005 | Canter et al. | 320/118 |
| 7,081,737 B2 | 7/2006 | Liu et al. | |
| 7,723,956 B2 * | 5/2010 | Tatebayashi et al. | 320/119 |
| 2004/0135544 A1 * | 7/2004 | King et al. | 320/116 |
| 2006/0103351 A1 | 5/2006 | Tanigawa et al. | |

FOREIGN PATENT DOCUMENTS

| | | |
|---|---|---|
| CN | 1402375 A | 3/2003 |
| CN | 1574540 A | 2/2005 |
| JP | 6253463 A | 9/1994 |
| JP | 11150877 A | 6/1999 |
| JP | 2000092732 A | 3/2000 |
| JP | 2003309931 A | 10/2003 |
| JP | 2006149068 A | 6/2006 |
| JP | 2007244142 A | 9/2007 |

OTHER PUBLICATIONS

English translation of the OA 2008-233966 (4 pages).

* cited by examiner

*Primary Examiner* — Richard V Muralidar (57) ABSTRACT

A cell balancing circuit comprises a first cell having a first voltage, a second cell in series with the first cell and having a second voltage that is greater than the first voltage, and a bypass path in parallel with the second cell for enabling a bypass current for the second cell if a difference between the first voltage and the second voltage is greater than a predetermined threshold. The bypass current is enabled for a balancing time period that is proportional to the difference between the first voltage and the second voltage.

4 Claims, 6 Drawing Sheets

SYSTEMS AND METHODS FOR CELL BALANCING

RELATED APPLICATION

This application is a continuation-in-part of the co-pending U.S. application Ser. No. 11/903,850, filed on Sep. 25, 2007, entitled "Systems and Methods for Cell Balancing", by inventors Flavius Lupu, Constantin Bucur, Xiaojun Zeng, Kaiyi Sheng, and Anquan Xiao, which is hereby incorporated by reference in its entirety.

TECHNICAL FIELD

This invention relates to a battery protection system, and more particularly to a cell balancing system.

BACKGROUND ART

In a multi-cell battery pack, cells may differ from each other due to cell aging and different cell temperatures. A voltage difference between the cells may increase as the number of charging/discharging cycles increases, which may cause imbalance between the cells and may shorten a battery life.

During a time period when the battery pack is discharged with a relatively high current, if the imbalance between the cells reaches a certain limit, a voltage reversal on the weakest cell may result in permanent damage for the weakest cell.

SUMMARY OF THE INVENTION

In one embodiment, a cell balancing circuit comprises a first cell having a first voltage, a second cell in series with the first cell and having a second voltage that is greater than the first voltage, and a bypass path in parallel with the second cell for enabling a bypass current for the second cell if a difference between the first voltage and the second voltage is greater than a predetermined threshold. The bypass current is enabled for a balancing time period that is proportional to the difference between the fist voltage and the second voltage.

BRIEF DESCRIPTION OF THE DRAWINGS

Features and advantages of embodiments of the claimed subject matter will become apparent as the following detailed description proceeds, and upon reference to the drawings, wherein like numerals depict like parts, and in which:

DETAILED DESCRIPTION

Reference will now be made in detail to the embodiments of the present invention. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

Figure 1:
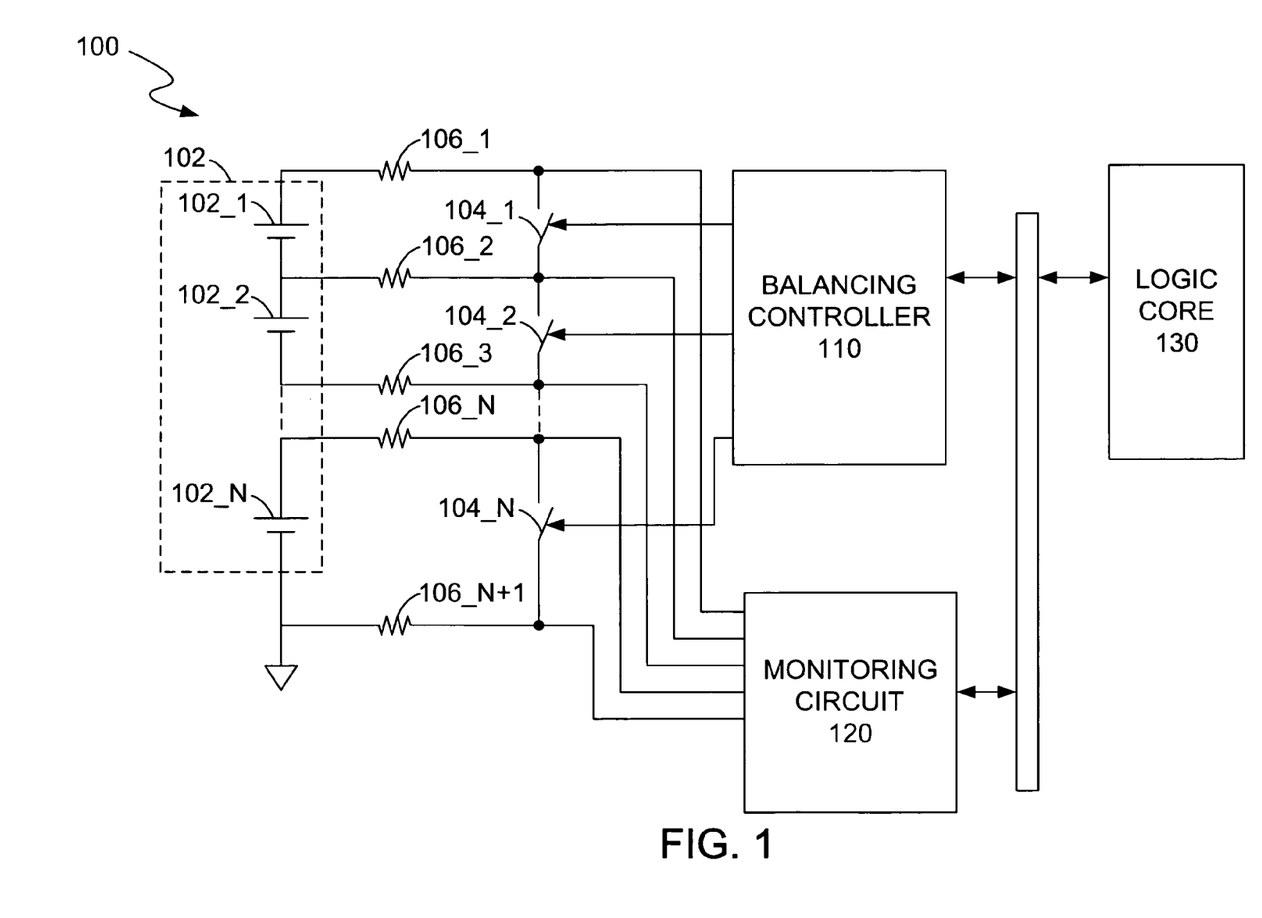
FIG. 1 shows a block diagram of a cell balancing system, in accordance with one embodiment of the present invention.

FIG. 1 shows a block diagram of a cell balancing system 100, in accordance with one embodiment of the present invention. As shown in the example of FIG. 1, the cell balancing system 100 includes a battery pack 102 having a plurality of cells 102_1-102_n. Not all of the cells are shown in FIG. 1 for reasons of brevity and clarity. Each of the plurality of cells 102_1-102_n has a corresponding bypass path in parallel with the corresponding cell. For example, cell 102_1 has a bypass path including a resistor 106_1, a resistor 106_2, and a switch 104_1. Cell 102_2 has a bypass path including a resistor 106_2, a resistor 106_3, and a switch 104_2. Cell 102_n has a bypass path including a resistor 106_n, a resistor 106_n+1, and a switch 104_n.

The cell balancing system 100 also includes a balancing controller 110, a monitoring circuit 120, and a logic core 130, in one embodiment. The balancing controller 110 controls the bypass path for each cell 102_1-102_n by controlling the corresponding switch 104_1-104_n (Not all of the switches are shown in FIG. 1 for reasons of brevity and clarity). The monitoring circuit 120 can monitor cell voltages for cells 102_1-102_n. The logic core 130 can receive monitoring signals from the monitoring circuit 120 and control the balancing controller 110. In one embodiment, the logic core 130 can be a processor (e.g., a micro-processor) or a state machine.

In one embodiment, the monitoring circuit 120 includes an analog-to-digital converter (ADC) 120. During each ADC cycle, the ADC 120 checks cell voltages for all the cells 102_1-102_n, and the logic core 130 receiving monitoring signals from the ADC 120 will determine if any cell meets an unbalanced condition. Advantageously, a corresponding bypass path will be conducted if a cell meets an unbalanced condition, such that a bypass (or bleeding) current can flow through the corresponding bypass path.

Figure 2:
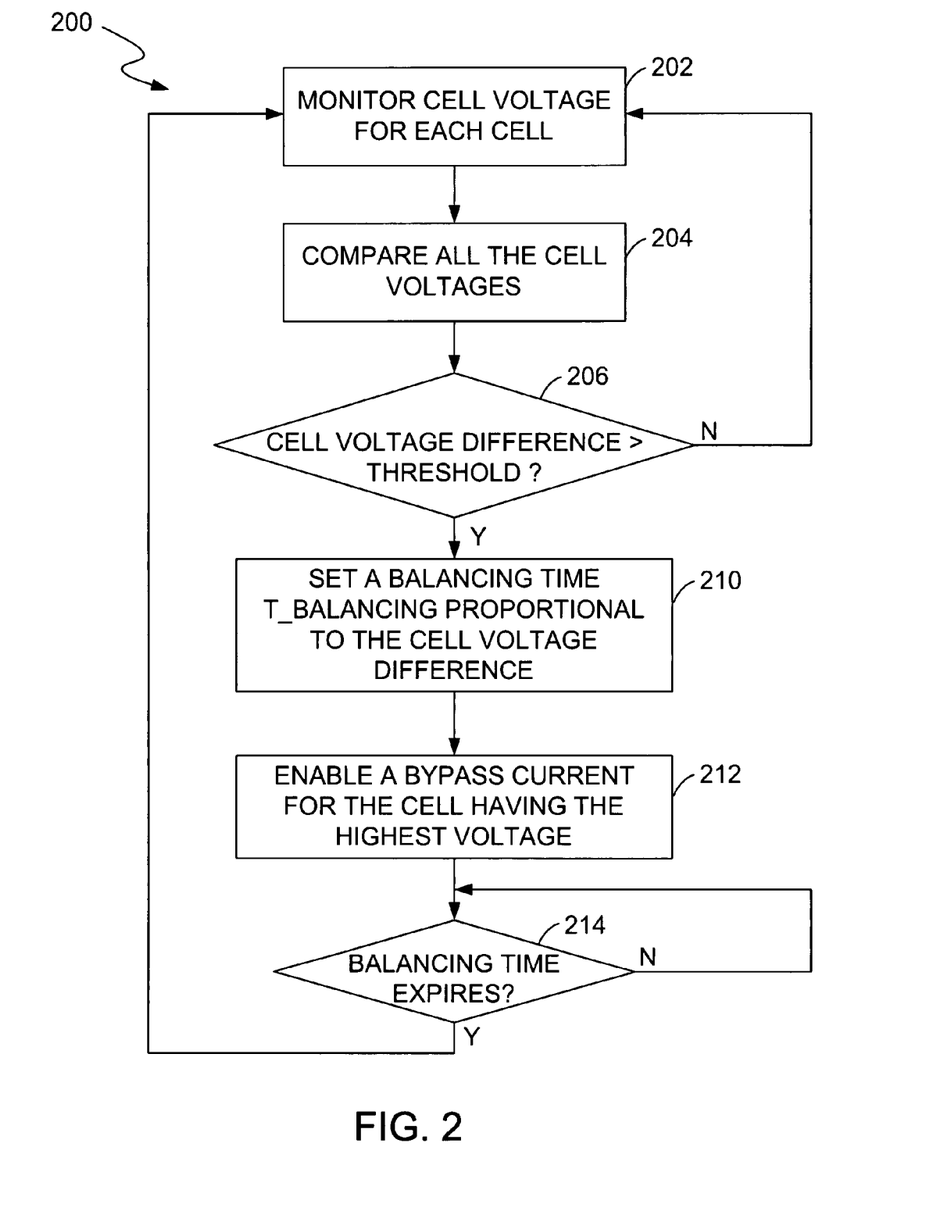
FIG. 2 shows a flowchart of operations performed by a cell balancing system, in accordance with one embodiment of the present invention.

FIG. 2 shows a flowchart 200 of operations performed by the cell balancing system 100, in accordance with one embodiment of the present invention. FIG. 2 is described in combination with FIG. 1.

In one embodiment, the battery pack comprises a first cell having a first voltage and a second cell in series with the first cell and having a second voltage that is greater than the first voltage. A bypass path in parallel with the second cell can be conducted to enable a bypass (or bleeding) current for the second cell, if a difference between the first voltage and the second voltage is greater than a predetermined threshold. Advantageously, the bypass (or bleeding) current for the second cell is enabled for a balancing time period that is proportional to the difference between the first voltage and the second voltage.

In block 202, a cell voltage for each cell 102_1-102_n is monitored. In one embodiment, the monitoring circuit 120 coupled to the plurality of cells 102_1-102_n monitors cell voltages and generates a monitoring signal for each cell indicative of a cell voltage. Monitoring signals are then sent to the logic core 130, in one embodiment. In block 204, cell voltages for cells 102_1-102_n are compared, for example, by the logic core 130.

In one embodiment, if a difference between a minimum cell voltage and a maximum cell voltage is greater than a predetermined threshold in block 206, the flowchart 200 goes to block 210. Otherwise, the flowchart 200 returns to block 202. For example, if a first cell 102_1 has a minimum voltage Vcell_min and a second cell 102_2 has a maximum voltage Vcell_max, and the difference between Vcell_min and Vcell_max is greater than the predetermined threshold, then the flowchart 200 goes to block 210.

In block 210, a predetermined balancing time T_balancing is set to an amount that is proportional to the difference between the minimum voltage Vcell_min and a maximum voltage Vcell_max. In one embodiment, the balancing time T_balancing is determined by a controller (e.g., logic core 130), which can be given by:

$$T\_balancing = (Vcell\_max - Vcell\_min) * Tcd / Vcell\_full \quad (1)$$

where Vcell_full represents a nominal voltage for a fully charged cell and Tcd represents a discharge time for depleting a fully charged cell. As shown in equation (1), the balancing time T_balancing is proportional to the difference between Vcell_min and Vcell_max.

In block 212, a bypass current is enabled for the cell having the maximum cell voltage Vcell_max. More specifically, a balancing controller 110 can switch on the corresponding switch to conduct the corresponding bypass path in parallel with the cell having the maximum cell voltage Vcell_max for the time period T_balancing. In block 214, if the balancing time T_balancing expires, the flowchart 200 returns to block 202 to start a new cycle. Otherwise, the flowchart 200 returns to block 214.

Therefore, a bypass path will be conducted for enabling a bypass current for the cell having the maximum cell voltage Vcell_max. In one embodiment, the bypass current is enabled for a time period T_balancing that is proportional to the difference between Vcell_min and Vcell_max, such that the cell initially having the maximum cell voltage Vcell_max will gradually reach the minimum cell voltage Vcell_min. The algorithm as shown in FIG. 2 can be implemented in different stages, such as charging, discharging, or idle stage of the battery, in one embodiment.

Figure 3:
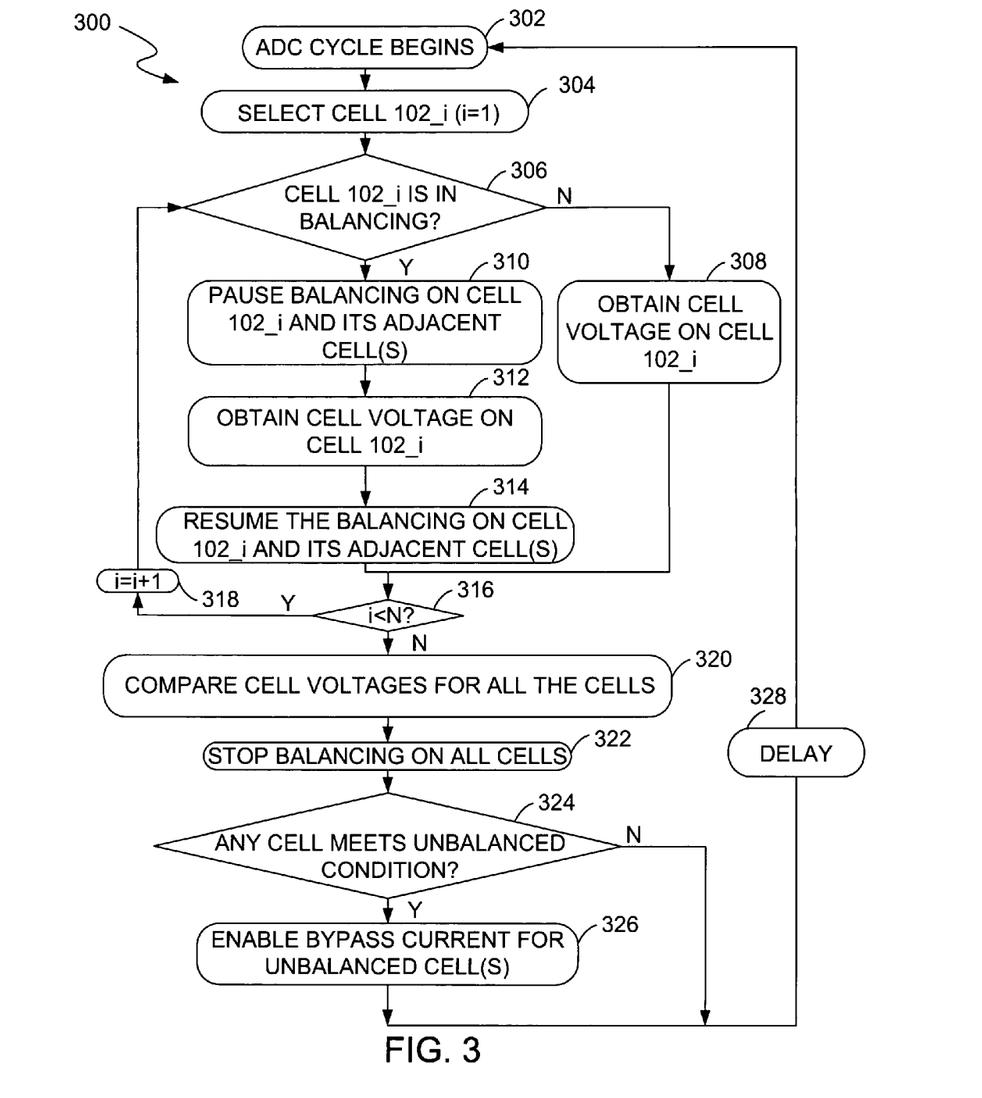
FIG. 3 shows a flowchart of operations performed by a cell balancing system, in accordance with one embodiment of the present invention.

FIG. 3 shows a flowchart 300 of operations performed by the cell balancing system 100, in accordance with one embodiment of the present invention. FIG. 3 is described in combination with FIG. 1.

In one embodiment, the cell balancing system 100 not only can enable cell balancing for one cell, but also can enable cell balancing for 2 or more cells simultaneously. For example, a first bypass path in parallel with a first cell can enable a first bypass (bleeding) current for the first cell. A second bypass path in parallel with a second cell can enable a second bypass current for the second cell coupled in series with the first cell. In one embodiment, the first bypass current and the second bypass current can be enabled simultaneously for a predetermined constant period if both first cell and second cell meet an unbalanced condition. The first bypass current flows through the first bypass path and the second bypass current flows through the second bypass path.

In one embodiment, both first cell and second cell meet the unbalanced condition if a first voltage of the first cell is greater than a predetermined threshold and a second voltage of the second cell is also greater than the predetermined threshold. In an alternative embodiment, both first cell and second cell meet the unbalanced condition if a first difference between the first voltage of the first cell and a third voltage of a third cell is greater than a predetermined threshold and a second difference between the second voltage of the second cell and the third voltage is also greater than the predetermined threshold.

In block 302, a new ADC cycle begins. In block 304, a cell 102_i (i=1) is selected. In block 306, if the selected cell 102_i is in balancing phase (that is, there is a bypass current flowing through a bypass path in parallel with the cell 102_i), the flowchart 300 goes to block 310.

In block 310, the cell balancing will be disabled temporarily for cell 102_i and cell(s) adjacent to cell 102_i (that is, the bypass current flowing through the corresponding bypass path for cell 102_i and cell(s) adjacent to cells 102_i will be disabled temporarily). For example, if cell 102_1 is selected, then cell balancing will be disabled temporarily for cells 102_1 and 102_2. If cell 102_2 is selected, then cell balancing will be disabled temporarily for cells 102_1, 102_2, and 102_3. If cell 102_N is selected, then cell balancing will be disabled temporarily for cells 102_N-1 and 102_N.

In block 312, the monitoring circuit 120 will obtain a cell voltage for the selected cell 102_i. More specifically, an ADC converter in the monitoring circuit 120 will convert an analog signal indicative of the cell voltage for cell 102_i to a digital signal, and send the digital signal to the logic core 130, in one embodiment. In block 314, the balancing on cell 102_i and cell(s) adjacent to 102_i will be resumed and the flowchart 300 goes to block 316.

Back to block 306, if the selected cell 102_i is not in balancing phase, the flowchart 300 goes to block 308. The monitoring circuit 120 will obtain a cell voltage for the selected cell 102_i. More specifically, the ADC converter in the monitoring circuit 120 will convert an analog signal indicative of the cell voltage for cell 102_i to a digital signal, and send the digital signal to the logic core 130, in one embodiment. The flowchart 302 goes to block 316.

In block 316, if i is less than the total number of cells N in the battery pack, the flowchart 300 goes to block 318. In block 318, i is increased by 1, such that a next cell is selected. The flowchart 300 returns to block 306. Blocks following block 306 that have been described above will not be repetitively described herein for purposes of clarity and brevity.

In block 316, if i is no less than the total number of cells N in the battery pack, the flowchart 300 goes to block 320. In block 320, the logic core 130 compares cell voltages for cells 102_1-102_N, in one embodiment. In block 322, balancing will be temporarily disabled for all the cells 102_1-102_N. In block 324, the logic core 130 can check if any cell meets an unbalanced condition. In one embodiment, a cell meets an unbalanced condition if the cell voltage is greater than a predetermined threshold. In one embodiment, a cell meets an unbalanced condition if a difference between the cell voltage and a voltage of another cell in the same battery pack is greater than a predetermined threshold. Advantageously, the cell balancing system 100 can balance one cell at a time, or balance multiple (e.g., 2 or more) cells simultaneously. For example, for a battery having N cells, the cell balancing system 100 can balance up to N-1 cells simultaneously according to system power tolerance and battery pack thermal consideration. In other words, the cell balancing system 100 can enable bypass current for N-1 cells simultaneously. In one embodiment, the number of cells balancing simultaneously can be determined by the logic core 130 and/or predetermined/programmed by a user.

In block 324, if there is one or more cells meet the unbalanced condition, the flowchart 300 goes to block 326. In block 326, bypass current is enabled for one or more cells which meet the unbalanced condition. Then the flowchart goes to block 302 after a delay 328 to start a new ADC cycle. The delay 328 can be predetermined and can also be set to zero. In block 324, if there is no cells meet the unbalanced condition, the flowchart 300 directly goes to block 302 to start a new ADC cycle.

Advantageously, in one embodiment, the cell balancing system 100 can perform cell balancing in a real-time fashion by continuously monitoring cell voltages in the battery pack 102. The unbalanced cell is balanced for a predetermined constant period. After the unbalanced cell is balanced for the predetermined constant period, the cell voltages in the battery pack are measured again to recheck if any cell meets the unbalanced condition. The predetermined constant period can be determined by an ADC cycle, e.g., less than an ADC cycle. The predetermined constant period can also be determined by a user by setting a delay time of the delay element 328.

The algorithm as shown in FIG. 3 can be implemented when cells in the battery pack are in a charging stage, a discharging stage, or an idle stage, in one embodiment.

Figure 4:
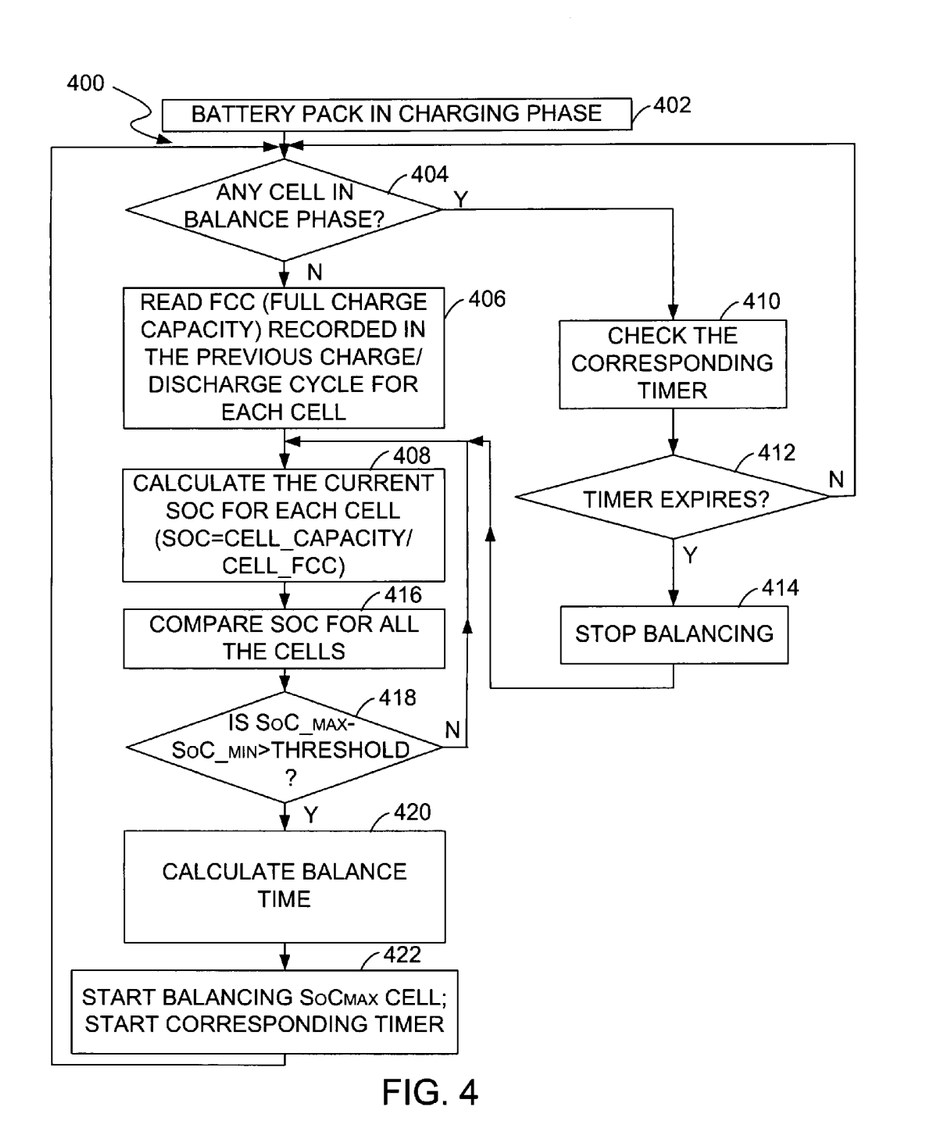
FIG. 4 shows a flowchart of operations performed by a cell balancing system, in accordance with one embodiment of the present invention.

FIG. 4 shows a flowchart 400 of operations performed by the cell balancing system 100, in accordance with one embodiment of the present invention. FIG. 4 is described in combination with FIG. 1.

In one embodiment, the cell balancing system 100 can perform cell balancing according to state-of-charge (SOC) of cells 102_1-102_n. In one embodiment, the logic core 130 can measure a first SOC indicative of a first charge level of a first cell and measure a second SOC indicative of a second charge level of a second cell. In one embodiment, the second SOC is greater than the first SOC. Advantageously, a bypass path in parallel with the second cell can enable a bypass current for the second cell if a difference between the first SOC and the second SOC is greater than a predetermined threshold. In one embodiment, the bypass current for the second cell is enabled for a balancing time period. In one embodiment, the balancing time can be set to an amount that is proportional to the difference between the first SOC and the second SOC. In an alternative embodiment, the balancing time can be set to an amount that is equal to a predetermined constant period.

In block 402, the battery pack 102 is in a charging phase. In block 404, the logic core 130 will determine if there is any cell currently in balancing phase. If there are no cells currently in balancing phase, the logic core 130 will read a full charge capacity (FCC) recorded in a previous charging/discharging cycle for each cell 102_1-102_N as shown in block 406, in one embodiment.

If there is one or more cells currently in balancing phase, the logic core 130 will check the corresponding timer which determines a balancing (bleeding) time as shown in block 410, in one embodiment. In block 412, if the timer does not expire, the flowchart 400 returns to block 404. In block 412, if the timer expires, the flowchart 400 goes to block 414. In block 414, the balancing is temporarily disabled, in one embodiment. The flowchart 400 goes to block 408.

In block 408, the logic core 130 can calculate the current state-of-charge (SOC) for each cell 102_1-102_N in the battery pack 102. In one embodiment, the SOC for each cell is determined by a ratio of a current cell capacity to a full charge capacity (FCC). In one embodiment, the cell balancing system 100 can predict which cell(s) will need to be balanced in advance by calculating the SOC for each cell.

In block 416, the SOC for all the cells are compared, e.g., by the logic core 130. In one embodiment, the logic core 130 can search the minimum SOC and the maximum SOC among cells 102_1-102_N in the battery pack 102. In block 418, if a difference between the minimum SOC and the maximum SOC is greater than a predetermined threshold, the flowchart 400 goes to block 420. Otherwise, the flowchart 400 returns to block 408. Blocks following block 408 that have been described above will not be repetitively described herein for purposes of clarity and brevity.

In block 420, the balancing time T can be determined by the logic core 130. In one embodiment, the balancing time is proportional to the difference between the minimum SOC and the maximum SOC. In block 422, the cell having the maximum SOC starts to balance (e.g., by enabling its bypass current through the corresponding bypass path) and the corresponding timer is started. The flowchart 400 returns to block 404 to start a new cycle. Advantageously, the cell balancing system 100 can determine to balance which cell(s) according to a state-of-charge of each cell instead of a cell voltage of each cell.

The algorithm as shown in FIG. 4 can be implemented when cells in the battery pack are in a charging stage, a discharging stage, or an idle stage, in one embodiment.

Figure 5A:
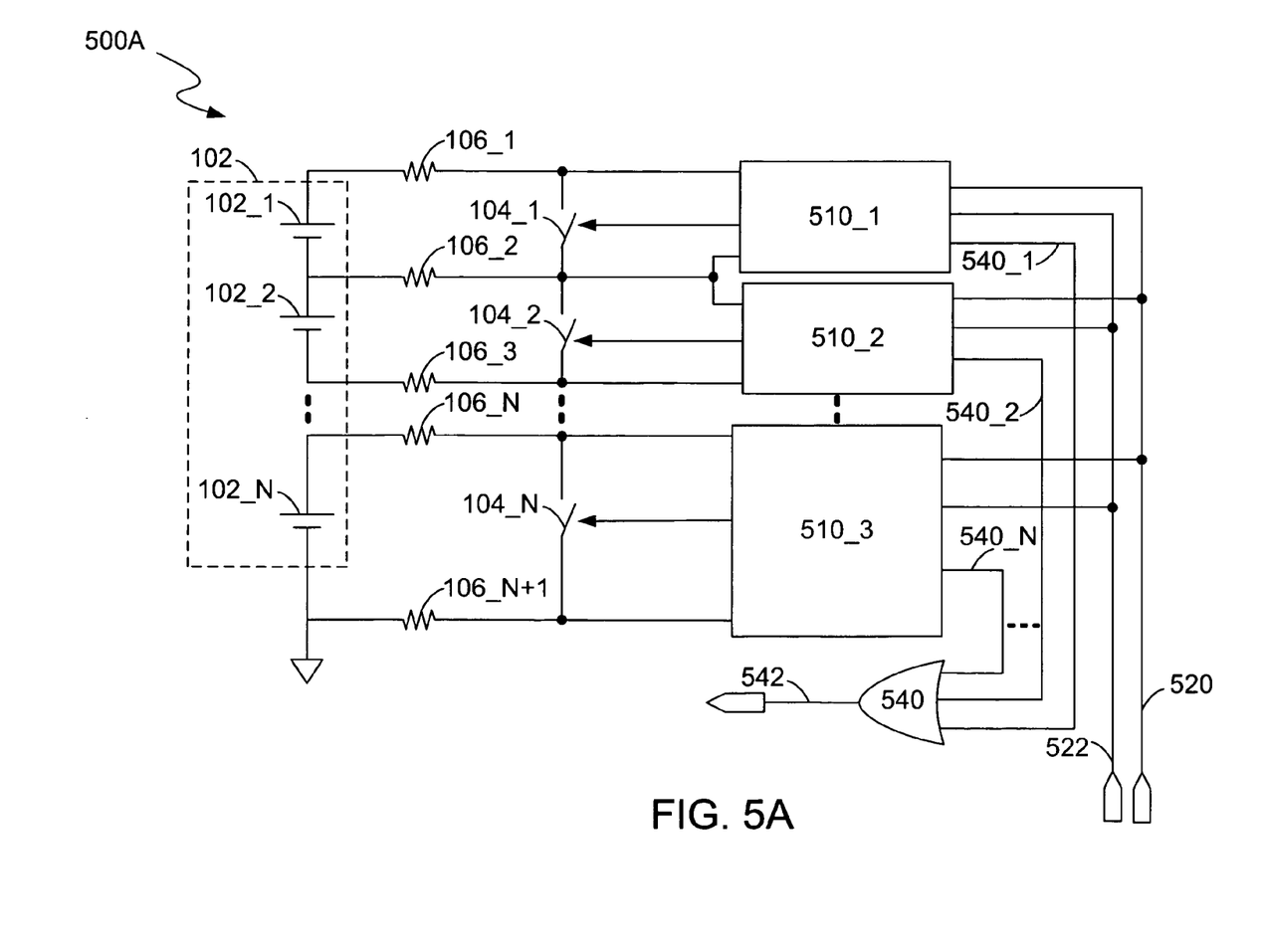
FIG. 5A shows a block diagram of a cell balancing system, in accordance with one embodiment of the present invention.

FIG. 5A shows a cell balancing circuit 500A for enabling a look ahead cell balancing, in accordance with one embodiment of the present invention. Elements that are labeled the same as in FIG. 1 have similar functions and will not be repetitively described herein for purposes of brevity and clarity.

Advantageously, the cell balancing system 500A enables cell balancing before the cell reaches the predetermined maximum cell charging voltage (full cell charge voltage). For example, a bypass current can be enabled for a cell which reaches a cell voltage equal to 90% of the maximum cell charging voltage. By start balancing before the cell reaches the predetermined maximum cell charging voltage, the unbalanced cell will have a longer balancing time, therefore further extending the battery life, in one embodiment. In one embodiment, the look ahead cell balancing circuit 500A as shown in FIG. 5A can be used in, but is not limited to, the charging process of the battery pack 120.

The cell balancing system 500A includes a charging and balancing controller 510_1-510_N for each cell 102_1-102_N in the battery pack 102. Not all of the charging and balancing controllers are shown in FIG. 500A for reasons for brevity and clarity. Each charging and balancing controller 510_1-510_N monitors a cell voltage of a corresponding cell 102_1-102_N and generates a balancing control signal for each cell 102_1-102_N, in one embodiment. Each charging and balancing controller 510_1-510_N receives a reference signal 522 which represents a predetermined maximum cell charging voltage and a reference signal 520 which represents a predetermined balancing threshold that is less than the predetermined maximum cell charging voltage (full cell charge voltage), e.g., 90% of the predetermined maximum cell charging voltage. Each charging and balancing controller 510_1-510_N also receives a cell voltage for a corresponding cell 102_1-102_N.

In one embodiment, each charging and balancing controller 510_1-510_N generates a charging termination signal 540_1-540_N (not all of the charging and balancing controllers are shown in FIG. 500A for reasons for brevity and clarity) to halt charging power to the battery pack 102 if a cell voltage of any cell reaches a predetermined maximum cell charging voltage. In one embodiment, an OR gate 540 receives charging termination signals 540_1-540_N. If any of charging termination signals 540_1-540_N has a high level, the OR gate 540 will generate a control signal 540 to halt charging power to the battery pack 102, in one embodiment. Furthermore, each charging and balancing controller 510_1-510_N generates a cell balancing signal to enable a bypass current flowing through a corresponding bypass path if a cell voltage of a corresponding cell reaches the predetermined balancing threshold that is less than the predetermined maximum cell charging voltage, in one embodiment. The bypass current is enabled by switching on the corresponding switch 104_1-104_N.

The algorithm as shown in FIG. 5A can be implemented when cells in the battery pack are in a charging stage, a discharging stage, or an idle stage, in one embodiment.

Figure 5B:
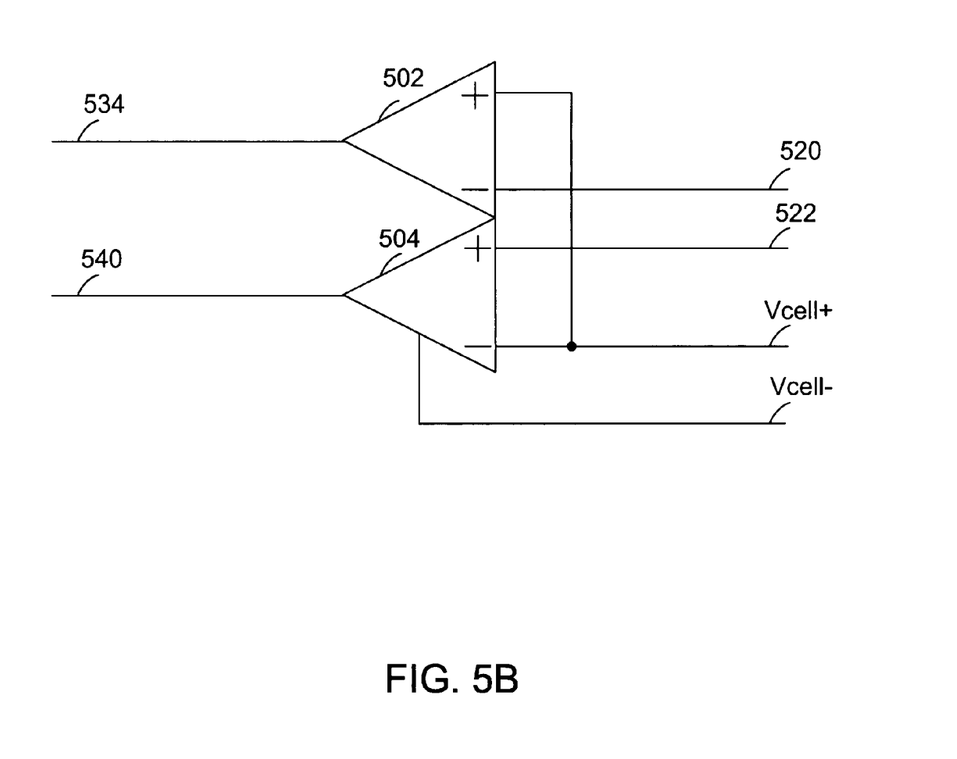
FIG. 5B shows an exemplary circuit diagram of a charging and balancing controller in FIG. 5A, in accordance with one embodiment of the present invention.

FIG. 5B shows anz exemplary circuit diagram for a charging and balancing controller in FIG. 5A, in accordance with one embodiment of the present invention. Elements that are labeled the same as in FIG. 5A have similar functions and will not be repetitively described herein for purposes of brevity and clarity.

Each charging and balancing controller 510_1-510_N in FIG. 5A has similar structure as shown in FIG. 5B. In one embodiment, each charging and balancing controller 510_1-510_N includes a first comparator 504 for comparing a cell voltage with the predetermined maximum cell charging voltage 522 and for generating the charging termination signal 540 according to a comparison result. Each charging and balancing controller 510_1-510_N further includes a second comparator 502 for comparing the cell voltage with the predetermined balancing threshold 520 (e.g., 90% of the predetermined maximum cell charging voltage) and for generating the cell balancing signal 534 according to a comparison result. Signals Vcell+ and Vcell− are respectively coupled to a positive terminal and a negative terminal of a corresponding cell.

Accordingly, in one embodiment, a cell balancing system is provided. The cell balancing system can be used to balance a battery pack according to different cell balancing algorithms, thereby reducing imbalance between the cells and extending a battery life. Advantageously, a balancing/bleeding accuracy of the cell balancing system can be predetermined (programmed). For example, cell balancing can be terminated if a cell voltage difference between any two cells is less than a predetermined (programmable) threshold or if a cell capacity difference between any two cells is less than a predetermined (programmable) threshold.

While the foregoing description and drawings represent embodiments of the present invention, it will be understood that various additions, modifications and substitutions may be made therein without departing from the spirit and scope of the principles of the present invention as defined in the accompanying claims. One skilled in the art will appreciate that the invention may be used with many modifications of form, structure, arrangement, proportions, materials, elements, and components and otherwise, used in the practice of the invention, which are particularly adapted to specific environments and operative requirements without departing from the principles of the present invention. The presently disclosed embodiments are therefore to be considered in all respects as illustrative and not restrictive, the scope of the invention being indicated by the appended claims and their legal equivalents, and not limited to the foregoing description.

What is claimed is:

1. A cell balancing circuit for balancing a plurality of cells, comprising:
   a logic core operable for detecting if any cell is in balancing phase, reading a full charge capacity (FCC) recorded in a previous cycle for each cell when no cell is in said balancing phase, checking a timer coupled to a cell if said cell is in said balancing phase, balancing said cell while said timer is counting, and terminating said balancing phase when said timer expires, for calculating a state-of-charge (SOC) for each of said cells, for searching a minimum SOC and a maximum SOC of said cells, for detecting an unbalanced condition if a difference between said maximum SOC and said minimum SOC is greater than a predetermined threshold, and for determining a balancing time period that is proportional to said difference if said unbalanced condition occurs,
   wherein said cell balancing circuit enables a bypass current for a cell having said maximum SOC for said balancing time period if said unbalanced condition occurs.

2. The cell balancing circuit as claimed in claim 1, wherein said SOC for each of said cells is determined by a ratio of a cell capacity of each of said cells to said full charge capacity of each of said cells.

3. A method for balancing a plurality of cells, comprising:
   detecting if any cell is in balancing phase;
   reading a full charge capacity (FCC) recorded in a previous cycle for each cell when no cell is in said balancing phase;
   checking a timer coupled to a cell if said cell is in said balancing phase;
   balancing said cell while said timer is counting;
   terminating said balancing phase when said timer expires;
   calculating a state-of-charge (SOC) for each of said cells;
   searching a minimum SOC and a maximum SOC of said cells;
   detecting an unbalanced condition if a difference between said maximum SOC and said minimum SOC is greater than a predetermined threshold;
   determining a balancing time period that is proportional to said difference if said unbalanced condition occurs; and
   enabling a bypass current for a cell having said maximum SOC for said balancing time period if said unbalanced condition occurs.

4. The method as claimed in claim 3, wherein said SOC for each of said cells is determined by a ratio of a cell capacity of each of said cells to said full charge capacity of each of said cells.

* * * * *